(No Model.)
J. S. COPELAND.
CHAIN ADJUSTMENT FOR BICYCLES.
No. 484,492. Patented Oct. 18, 1892.
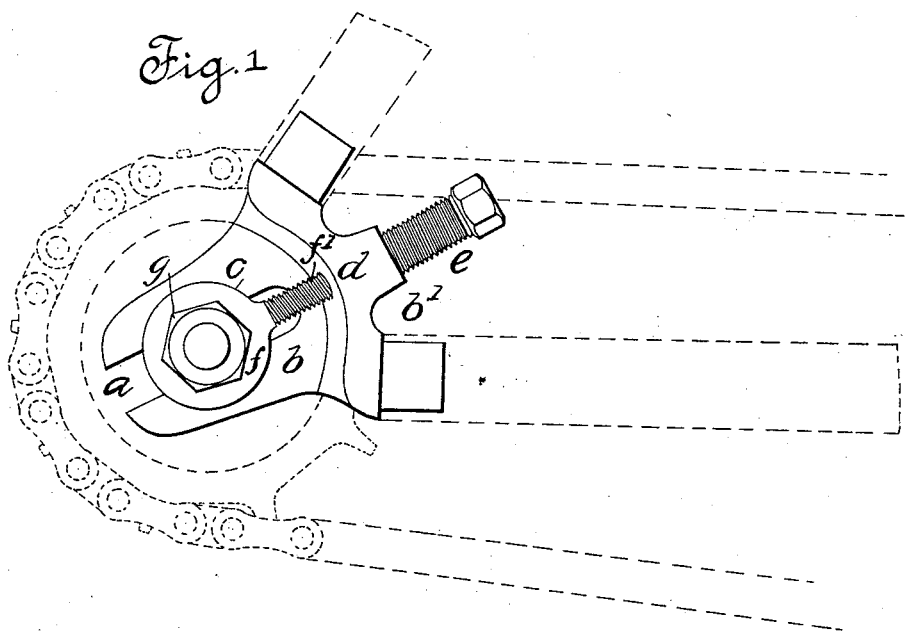
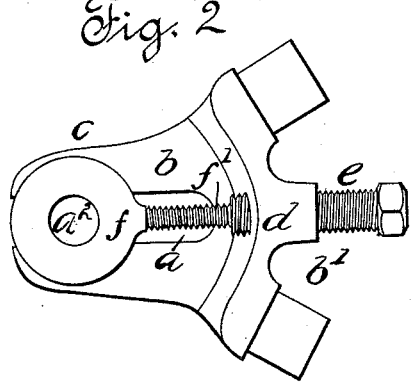
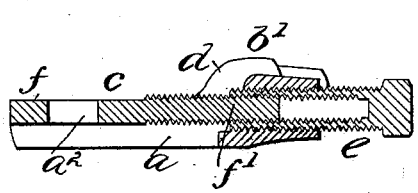
Witnesses
C. B. Chandler
G. B. Jenkins
Inventor
James S. Copeland
by Chas. L. Burdett
Attorney.

UNITED STATES PATENT OFFICE.

JAMES S. COPELAND, OF HARTFORD, CONNECTICUT, ASSIGNOR TO THE POPE MANUFACTURING COMPANY, OF BOSTON, MASSACHUSETTS.

CHAIN ADJUSTMENT FOR BICYCLES.

SPECIFICATION forming part of Letters Patent No. 484,492, dated October 18, 1892.

Application filed April 20, 1892. Serial No. 429,822. (No model.)

*To all whom it may concern:*

Be it known that I, JAMES S. COPELAND, of Hartford, in the county of Hartford and State of Connecticut, have invented certain new and useful Improvements in Chain Adjustments for Bicycles, of which the following is a full, clear, and exact description, whereby any one skilled in the art can make and use the same.

The object of my invention is particularly to provide a device by means of which the driving-chain of a bicycle or a like part may be readily and conveniently adjusted with accuracy; and to this end my invention consists in the details of the several parts making up the adjusting device as a whole and in their combination, as more particularly hereinafter described, and pointed out in the claims.

Referring to the drawings, Figure 1 is a detail side view of the adjusting device. Fig. 2 is a detail side view showing the parts in a different position of adjustment. Fig. 3 is a detail view in lengthwise section through the feed-screw.

My invention is particularly adapted for use in connection with the class of chain-driven bicycles in which the driving-chain extends from the crank-shaft to a sprocket-wheel fast to the axis of the driving-wheel. In use such a chain is apt to stretch, and in order to provide for the proper tension of the chain to obtain the best results from the expenditure of a given power it is necessary that the axis of the crank and of the driving-wheel shall be made adjustable with relation to the shortest distance between them.

In the accompanying drawings the letter $a$ denotes a guide-slot that is formed in any suitable position in that part of the frame $b$ through which the axle of the driving-wheel extends. The wheel is located between the side parts of the frame $b$, in which two guide-slots are formed directly opposite each other, and adjacent to each guide-slot duplicate adjusting devices $c$ are provided. It is the custom of most makers to construct this frame of several parts, comprising tubing and corner pieces or blocks, the latter being either castings or forgings. Such a corner-block $b'$ is provided with a guide-slot $a$, with a threaded socket in the flange $d$, that supports a feed-screw $e$ in line with the slot, this feed-screw having lengthwise thereof a threaded socket that receives the threaded shank $f'$ of the slide-block $f$. The axle extends through this slide-block and is held in place by a nut $g$, arranged on the outer side of the block.

The forging or casting forming the corner-block $b'$ is a distinct article of manufacture often furnished by those making a specialty of such work to the maker of the bicycles, who, by securing the tubing to these parts, make up the frame for a bicycle or like vehicle. When the parts are assembled, the axle of the driving-wheel extends transversely across the frame through the slots $a$ and through the opening $a^2$ in the slide-block, the threaded shank of which is provided, preferably, with a right-handed screw, while the feed-screw has a left-handed screw-thread on its outer surface that fits the threaded socket in the flange of the block. The result of this construction of the two screws is that about twice the extent of movement of the slide-block is obtained with a comparatively-short length of feed-screw. By the means of this adjustment an extremely-accurate movement of the axle of the driving-wheel is possible, and the whole forms a simple, durable, and extremely-effective means of controlling and adjusting the position of the axle of the driving-wheel.

The block as a whole, fitted with the adjusting device, forms in itself an article of manufacture that may be made up for the trade and used in any make of velocipede or bicycle. The device is evidently adapted for use not only in the adjustment of the driving-wheel of a bicycle, but also in the adjustment of similar parts where like conditions of use are found.

I claim as my invention—

1. In combination with the frame of a bicycle or like vehicle, an axle extending through a guide-slot and the adjusting device comprising a compound feed-screw and slide-block attached by interengaging threaded parts or surfaces, all substantially as described.

2. In combination with the driving-wheel of a velocipede or like vehicle, the axle extending through the guide-slot, the feed-screw borne in a threaded socket in the frame, and a guide-block embracing the axle and provided with a threaded shank fitting a threaded lengthwise socket in the feed-screw, the thread on the feed-screw and on the shank being of opposite pitch, all substantially as described.

3. As an improved article of manufacture, a corner-block for a frame for a bicycle or like vehicle, provided with a guide-slot, a guide-block extending crosswise of the slot with a threaded shank fitting a lengthwise threaded socket in a feed-screw, and the feed-screw fitting a threaded socket in the corner-block and in alignment with the guide-slot, the threads of the feed-screw and shank of the guide-block being of opposite pitch, all substantially as described.

JAMES S. COPELAND.

Witnesses:
F. W. STARR,
A. B. JENKINS.